United States Patent [19]

Falk

[11] 4,196,224

[45] Apr. 1, 1980

[54] METHOD AND APPARATUS FOR HUSKING AND DRYING CEREAL AND LEGUME KERNELS

[75] Inventor: Otto Falk, Kremperheide, Fed. Rep. of Germany

[73] Assignee: Steinmetz-Patent-Mullerei KG, Krempe, Fed. Rep. of Germany

[21] Appl. No.: 817,885

[22] Filed: Jul. 20, 1977

[30] Foreign Application Priority Data

Jul. 23, 1976 [DE] Fed. Rep. of Germany ....... 2633275

[51] Int. Cl.[2] .......................... A23L 1/10; A23N 5/00

[52] U.S. Cl. ...................................... 426/483; 99/574; 99/609; 99/621; 99/622; 99/624; 99/625; 99/628; 241/7; 241/253; 241/261.1; 426/482; 426/518

[58] Field of Search ....................... 426/482, 483, 518; 241/7, 9, 12, 251, 253, 261.1; 99/601, 609, 617, 623, 622, 624, 625, 574, 628, 621; 209/3, 138, 139

[56] References Cited

U.S. PATENT DOCUMENTS

| | | | |
|---|---|---|---|
| 293,047 | 2/1884 | Mackey | 241/261.1 X |
| 673,995 | 5/1901 | Bardet | 426/482 X |
| 807,990 | 12/1905 | Ball | 426/483 |
| 1,296,797 | 3/1919 | Hare | 241/261.1 X |
| 2,282,718 | 5/1942 | Fujioka | 99/609 |
| 2,366,711 | 1/1945 | Earle | 426/483 |
| 2,430,572 | 11/1947 | Kennedy | 99/622 X |
| 3,427,690 | 2/1969 | Haug | 241/261.1 X |
| 3,734,752 | 5/1973 | Headley | 426/483 X |
| 3,933,317 | 1/1976 | Rovere | 241/261.1 X |
| 3,962,479 | 6/1976 | Coldren | 426/482 X |

*Primary Examiner*—Arthur L. Corbin
*Attorney, Agent, or Firm*—Ladas, Parry, Von Gehr, Goldsmith & Deschamps

[57] ABSTRACT

The present invention relates to a method and apparatus for the husking and drying of cereal and legume kernels comprising separating the kernels from their husks by means of rotating plate bodies and discharging the husks from the kernels/husks mixture by means of air.

1 Claim, 6 Drawing Figures

METHOD AND APPARATUS FOR HUSKING AND DRYING CEREAL AND LEGUME KERNELS

BACKGROUND OF THE INVENTION

In the known methods for husking washed kernels in moist or dry condition, it is impossible under dry conditions to detach or remove single layers of the kernels. This has been stated in the report by Professor Seibel and Mill Engineer Zwingelberg on the 26th Meeting of "Mullerei-Technologie 1975" (Milling Technology 1975) entitled "Reduction of Residues of Plant-Protective Agents by Treatment of the Surfaces of Wheat Kernels", pp. 24–33.

In the moist husking method (German Patent No. 1,177,456), the furrows of the kernels are fully filled by the forced comminution of the husks in the agitated heap of grains under the pressure caused by damming up, and the kneading pins used in the mill between the rotating kneading blades cause crushing, shearing, break-up and detachment of the germs. Moreover, the pressure generated under damming causes high energy losses also in the husking step in which the rotation of the kernels upstream of the working plate is considerably retarded as a result of said pressure, which reduces the working surface of the jacket or sleeve to 75%. This reduction, in turn, makes it necessary to provide for longer drums which results in higher or increased energy consumption.

SUMMARY OF THE INVENTION

It is the object of the present invention to detach, separate and remove the husks also from cereals having furrowed kernels without closing or filling the gap or groove of the kernels, and without detaching from the kernel or impairing or damaging the nutritionally valuable germ. It is a further object of the invention to carry out the husking of the moist cereal and/or legume kernels efficiently in a single machine unit. The objects are achieved by introducing the kernels or grains with a moisture content of from 5 to 30% between two plate bodies provided with an elastic coating. Said plate bodies rotate at different rates of revolution, and the kernels charged or introduced at the center of the rotating plate bodies are forced or driven towards the edges of said plate bodies at which said plates have a spacing from each other corresponding to the smallest grain diameter. At these edges the pericarp is removed from the individual kernels by a rolling action as a result of different rates of rotation of the plate bodies, and the kernels/husks mixture leaving said plate bodies is separated by means of sucked-in air.

For carrying out the method of the present invention, a machine is used which comprises an upright drum with two externally driven shafts extending vertically in said drum. In the upper portion, the husks are detached from the washed kernel material by friction and as a result of the different rates of rotation of the plate bodies, and in the lower portion of the drum, the kernels/-husks mixture is dried by means of sucked-in air, and the husks so detached are discharged. Centrifugal blades provided in the center of the upper plate body accelerate the washed kernels to the speed of rotation, so that the kernels will be concentrated within the narrowing angle between the working surfaces in the space between the plate bodies. As a result of the different rates of rotation of the lower plate body driven by the second drive, the kernels roll-off the pericarp between the readily exchangeable conical plates made of elastic material such as rubber and hemp and/or synthetic fiber material and steel reinforcement.

The axial spacing between the abrasion-resistant coatings of the plate bodies may be changed during operation in accordance with the processed grain size, namely with the help of a crank handle acting by way of a shaft and a chain drive on a threaded bushing in which the driving shaft is supported. By predetermining the hardness of the coatings, the impression of the kernel into the coating (in other words, the enclosing of the surface of the grain or kernel) may be precisely adjusted to the particular cereal or legume which is being processed.

The flow of suction air streaming axially upwardly in the annular chute between the vertically standing drum and the plate bodies seizes the husks of the kernels/-husks mixture, and transports or carries said husks under simultaneous drying to the axial or radial outlet of the drum. The kernels or grains on the other hand drop axially in said annular chute against the flow of the sucked-in air, and are subjected to rotation by the driving elements of the cylindrical rotor disposed beneath the plate bodies and driven by the lower driving shaft. Said driving elements of the rotor are adjusted at an angle relative to the drum and thereby determine the rotary track or trajectory and the rate of rotation of the kernels. In the course of said rotary motion, the kernels wander along the sleeve or jacket coated with elastic material which causes a short-time adhesion of the detached pericarp still remaining on the kernels. The air flows through the machine from the bottom upwardly, namely through an axially adjustable cylinder, subsequent radial to the annular chute across the bottom plate, and upwardly through said annular chute against the kernels, taking along the milling dust and the husks, and finally to the outside by way of the suction air outlet. The kernels or grains move downwardly in said annular chute until reaching the bottom plate closing off the drum, and are conveyed from there radially to the outside by means of driving or propelling means and by way of a discharge gate which is closed under predetermined pressure.

DETAILED DESCRIPTION OF THE INVENTION

The present invention is explained with the help of an embodiment shown in the drawings in which.

Furthermore, the material having an ad hoc adhesion relative to the pericarp results in a low noise level, and the entire method may be carried out using only one single drum. Also, as a result of guiding the flow in a favorable manner, removing the husks by roll-off action, and the high rates of revolution, the energy requirements are reduced to a minimum of from 0.2 to 0.5 kW per each 100 kg of material.

Figure 1:
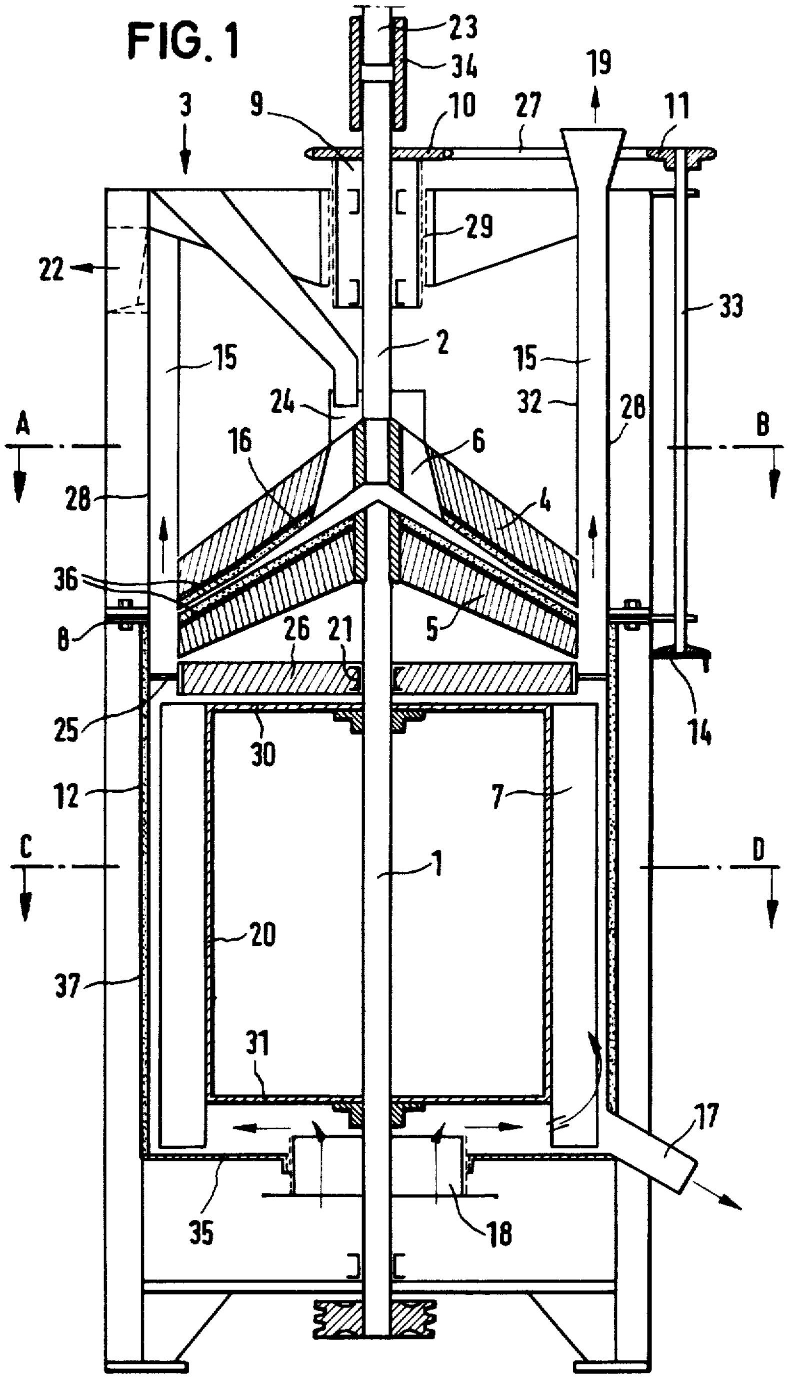
FIG. 1 is a sectional view of a machine according to the invention for the husking of cereals and legumes.
Figure 2:
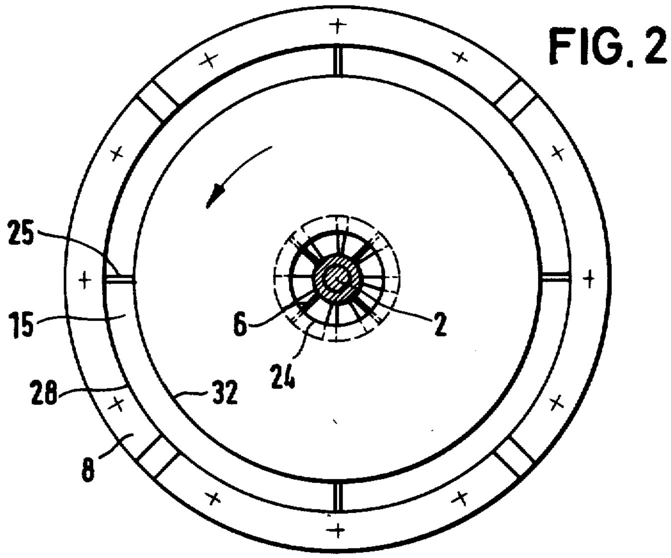
FIG. 2 shows a section taken along line A-B of FIG. 1.
Figure 3:
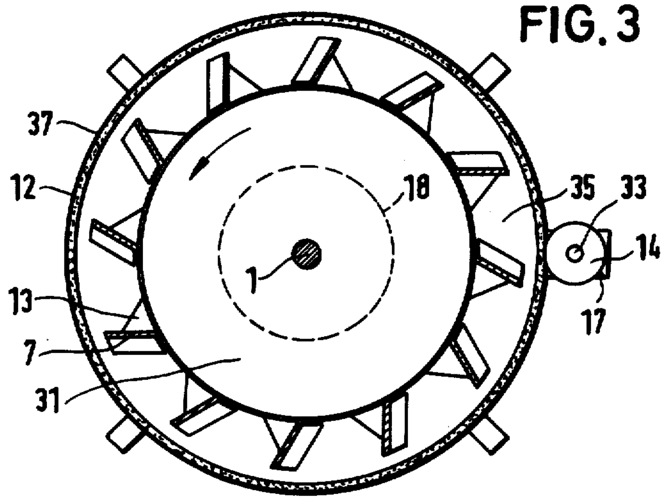
FIG. 3 shows a section taken along line C-D of FIG. 1.

The machine illustrated in the drawings for husking cereals and legumes comprises a drum with a charging pipe 3 (FIG. 1) feeding into receiving cylinder 24 above centrifugal blades 6 in the center of the upper plate body 4 secured at the lower end of an axially adjustable shaft 2. Plate body 4 has the form of a conical sleeve or jacket into which there is introduced from the bottom a conically shaped plate body 5 secured at the upper end of shaft 1 with the peak of the cone pointing upwards. The facing surfaces of said plate bodies (conical disks) are provided with exchangeable plates 36 having working coatings 16. These coatings extend from the outer circumference inwardly first parallel to each other for about 100 to 200 mm, and subsequently with an increasing spacing between each other toward the center, so that an angle (charging or drawing-in angle) is formed between said coatings. Cylindrical drum 20 with face surfaces 30 and 31 is provided on the externally driven shaft 1 coaxially relative to plate body 5 supported with its peak facing upwardly. Propelling vanes 7 are disposed on the circumference of drum 20 and secured by means of angular supports 13 (FIG. 3), at an angle relative to the jacket. The elastic jacket coating 12 (identical with coatings 16) extends around said propelling means with a spacing of from 10 to 30 mm, and terminates in a discharge orifice 17 above bottom plate 35.

A cylinder 18, which is adjustable by rotation, is screwed into bottom plate 35 centrically around shaft 1. Bearing 21 of shaft 1 between plate body 5 and cylindrical drum 20 is provided in a disk 26 sealing against annular chute 15. Said disk 26 is supported in the annular chute 15 by means of tubular sleeves 25. Annular chute 15 starts on disk 26 and extends axially between drum jacket 28 and cylinder 32 towards an axial air discharge connection 19 or towards a tangential air discharge connection 22. A similar annular chute is formed between cylindrical drum 20 and drum jacket 37 provided with jacket coating 12.

By means of handwheel 14 acting on threaded bushing 9 by way of a shaft 33, sprocket wheel 11, chain 27, and sprocket wheel 10, shaft 2 supported in said bushing 9 with plate bodies 4 is axially adjustable in threaded bushing 29 relative to said plate bodies. Shaft 2 is driven by means of motor pin 23 by way of a clutch 34 in which two grooves (not shown in the drawing) displaced by 180° transmit the rotation onto two laid-in keys of shaft 2 which also are displaced by 180°.

Figures 4, 5, 6:
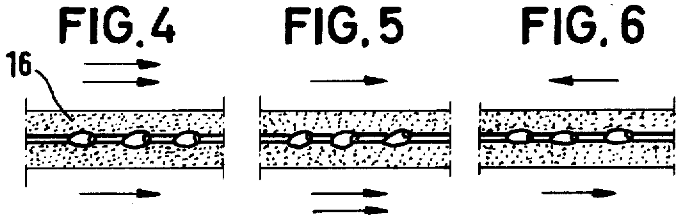
FIGS. 4 to 6 are schematic views of the working surfaces of FIG. 1 showing the penetration of the kernels into said working surfaces, the direction of rotation of said working surfaces and their different speeds of rotation being indicated by one and two arrows, respectively.

Centrifugal blades 6, which are centrically provided in plate body 4, are widened outwardly, and provided with different shapes or curvatures depending on the difference between the rates of revolution of the two plate bodies 4 and 5 (FIGS. 4, 5 and 6).

Usefully, the machine is divided at the level of the plate bodies, and provided with detachable connecting flanges 8, so that the upper portion of the machine may be quickly lifted off or folded down, for example for cleaning purposes.

The manner of operating the process of the invention is described in greater detail below.

The cereals or legumes to be treated have a moisture content of from 5 to 30% and are fed into the machine at inlet 3 to be accelerated into a conically expanding trajectory by means of propelling means or blades 6 seated on shaft 2, and forced into the narrowing space between plate bodies 4 and 5 by the compressed air produced or generated by said blades 6.

The grains or kernels arrive individually at plate bodies 4 and 5 coated with elastic coverings 16. The plate bodies extend parallel to each other with their edges, and rotate at different rates of revolution either in the same direction or opposed directions of rotation. The spacing between said coatings 16 is adjusted by means of the upper plate body 4 to about the smallest diameter of the smallest oval kernel or grain. The spacing between coatings 16 determines the impression or penetration of the kernels into said coatings and the amount of surface adhesion of both coatings 16 (FIGS. 4, 5 and 6); the pericarp being completely removed from the grains or kernels by a rolling-off action due to the difference in the rates of revolution of the plate bodies. Any pressure exerted on the grain or kernel as a result of the adjusted spacing serves only the purpose of achieving an adhesion of the grain surface on said coatings during the husking step involving an impression or penetration of the kernel into the elastic coating 16. This coating returns to its original shape after the kernel has been subjected to the rolling action, thereby terminating the adhesion to the hygroscopic pericarp, and such impression or penetration takes place only during the rolling-off action. The compressed air generated by propelling blades 6 cleans the rolled-off pericarp from the coating 16, and said air blows the rolled-off pericarp together with the kernels into annular chute 15 surrounding plate bodies 4 and 5.

The polishing and classifying of the kernels takes place in annular chute 15, for which purpose the lower part of the outer jacket of said annular chute is provided with the same elastic material as plate bodies 4 and 5, i.e. with material identical to coatings 16. The closed cylindrical drum 20 with propelling means 7 is mounted on shaft 1. Said propelling means or strips rotate coaxially with shaft 1, and centrifuge the kernels or grains against the jacket coating with an angle of impact of from 15 to 45°. Depending on the speed to which the kernels are accelerated by the propelling means, the angle of impact determines the varying depth with which the kernels penetrate into the elastic material. This determines the degree of adhesion and causes the loose husk particles to be detached from the kernels. The kernels under their own weight will drop prior to being seized again by propelling means 7 and centrifuged again against the coating of the jacket. Therefore, the path of the kernels up to discharge 17 takes an approximately spiral course extending on the inside along jacket coating 12, and may be changed by adjusting propelling means 7.

The separation of the kernels from the husks is achieved by sucking-in air through cylinder 18. This air is reversed by drum bottom plate 31 radially towards jacket coating 12 so that the air flows against the kernels, carrying along the polishing or grinding dust and the husks with the air passing between the plate bodies.

Together with the suction air flowing in spirals from the bottom, turbulences are created within the range of the mixture of compressed air, kernels and husks exiting from plate bodies 4 and 5, by which turbulences the pericarp is separated from the kernels in the best possible manner. The drying of the surfaces of the kernels and the drying of the pericarp is achieved by the air sucked into the machine, which air will simultaneously cool the coatings 16 on plate bodies 4 and 5. In this process the air is heated up thereby drying simultaneously the kernels and the pericarp. Also, the air sucked-in through cylinder 18 will heat itself on coatings 16 and on the kernels, which means that it is capable of absorbing and transporting more and more moisture towards air connection points 19 or 22.

The pericarp and the grinding or milling dust may be separated from the air in a separator unit arranged downstream of the machine. Coatings 16 and jacket coating 12 are made of a material which is a polyaddition product based on polyurethane. The initial components are Desmodur (R) (a group of isocyanates) and Desmophen (R) (group of higher molecular polyesters and polyesters of the alkyd resin type with functional hydroxyl groups) which are combined (added) and linked according to a defined formula.

The product falls within a range of hardness between rubber-elastic materials and hard plastic material (e.g. polyamide) and may be adjusted to a Shore hardness A between 65° and 98°. The product is extremely resistant to abrasion, it is highly elastic, resistant to tearing, aging and weathering, it suppresses vibrations, has dimensional stability, and it is resistant to oil, fat, gasoline, ozone and nitrogen.

I claim:

1. In a method for husking and drying cereal and legume kernels in a generally drum-shaped machine having co-axial truncated upper and lower plate bodies with a spacing between the plate bodies which is smaller at the edges than in the center, the improvement comprising the steps of:

(a) feeding the kernels into a kernel receiving cylinder arranged above the peak of the upper blade body;
(b) rotating the plate bodies at different rates of revolution;
(c) introducing the kernels at the center of the plate bodies;
(d) generating compressed air in the spacing between the plate bodies;
(e) separating the husks from the kernels by rolling off the pericarp from the kernels as a result of the kernels being engaged between the plate bodies, which rotate at different rates of revolution;
(f) blowing the mixture of husks and kernels, after they have been separated from the space between the plate bodies, into an annular chute surrounding the plate bodies;
(g) discharging the husks, which are lighter than the kernels, upwardly through said annular chute;
(h) polishing and classifying the kernels during passage through said annular chute;
(i) allowing the kernels to drop into a lower annular space to be impacted by propelling vanes mounted on a drum rotating with said lower plate body, causing the kernels to follow a spiral path in said lower annular space;
(j) detaching from the kernels loose husk particles by allowing the kernels to penetrate elastic material on the inside of said lower annular space;
(k) and sucking in air from below said lower annular space.

* * * * *